United States Patent
Meka et al.

(10) Patent No.: US 8,026,954 B2
(45) Date of Patent: Sep. 27, 2011

(54) SYSTEM AND COMPUTER-READABLE MEDIUM FOR AUTOMATIC WHITE BALANCING

(75) Inventors: Ramakrishna Venkata Meka, Bangalore (IN); Krishna Annasagar Govindarao, Bangalore (IN); Pallapothu Shyam Sundera Bala Koteswara Gupta, Bangalore (IN); Kopparapu Suman, Bangalore (IN); Ramkishor Korada, Bangalore (IN)

(73) Assignee: Aricent Inc., George Town, Grand Cayman (KY)

( * ) Notice: Subject to any disclaimer, the term of this patent is extended or adjusted under 35 U.S.C. 154(b) by 788 days.

(21) Appl. No.: 12/100,367

(22) Filed: Apr. 9, 2008

(65) Prior Publication Data
US 2008/0252748 A1    Oct. 16, 2008

(30) Foreign Application Priority Data
Apr. 10, 2007    (IN) .............................. 621/DEL/2007

(51) Int. Cl.
*H04N 9/73*    (2006.01)

(52) U.S. Cl. .................................................. 348/225.1
(58) Field of Classification Search ............... 348/223.1, 348/225.1, 227.1, 333.02; 345/102; 382/128
See application file for complete search history.

(56) References Cited

U.S. PATENT DOCUMENTS

| | | | |
|---|---|---|---|
| 7,015,955 B2 * | 3/2006 | Funston et al. | 348/223.1 |
| 2005/0226481 A1 * | 10/2005 | Hapert | 382/128 |

* cited by examiner

*Primary Examiner* — David Ometz
*Assistant Examiner* — Akshay Trehan
(74) *Attorney, Agent, or Firm* — Workman Nydegger

(57) ABSTRACT

Systems and computer-readable medium are disclosed for automatic white balancing of an input image. Accordingly, the system includes a cast detector configured to receive and classify an input image based at least in part on a selection of constituent pixels of the input image. The cast detector is further configured to select the constituent pixels based on a computed reliability of each of the constituent pixels to convey at least one characteristic of a capture illuminant. The system further includes a cast balancer. The cast balancer is configured to perform white balancing of the input image based on the classification of the input image by the cast detector. The cast balancer is further configured to identify the capture illuminant based on at least one characteristic represented by each of the selected constituent pixels.

7 Claims, 5 Drawing Sheets

SYSTEM AND COMPUTER-READABLE MEDIUM FOR AUTOMATIC WHITE BALANCING

FIELD OF INVENTION

The disclosed invention, in general relates to the field of image white balancing and more particularly, to a system for automatic white balancing of images.

BACKGROUND OF INVENTION

Typically, characteristics of an image captured by an image-capturing device (e.g. digital camera) depend on a number of factors. The factors include physical content of captured scene i.e. on reflectance properties, intensity, and color of a light source (capture illuminant) and spectral sampling properties of the image-capturing device. In a number of applications, such as object recognition, to digital photography, it is important that the colors recorded by the image-capturing device are constant across an illumination by different type of capture illuminants. An object captured by a camera may appear different in color when it is illuminated with different light sources (or capture illuminants). The object appears different because the color of light reflected from the object changes with the color of the light source.

A Light source (capture illuminant) is generally characterized by its color temperature, which is defined as a variation of color of a black body radiator with temperature. When a white object is illuminated with low color temperature light source, reflection from the object becomes reddish. On the other hand, a high temperature light source causes the same white object appear bluish.

Human visual system (HVS) has the ability to map white colors to a perception of white, even though an object has different surface reflections when it is illuminated with different light sources. However, image-capturing devices, like digital still cameras (DSCs), need to be taught how to map white color under a captured illuminant to white color under a viewing illuminant (illuminant used while viewing an image). The problem of making a white object appear as white under different types of illuminants (capture illuminant, viewing illuminant) is called white balancing. The capability to perform white balancing automatically without any user intervention is referred to as automatic or auto white balancing (AWB).

Existing systems and methods solve this problem by adjusting gains of the three primary colors (red (R), green (G), and blue (B)) of the sensor in the image capturing device. For example, one of the existing auto white balancing method involves controlling a balance of RGB components (red, green and blue) of each pixel in an image in such a manner that the average of the entire image results in an achromatic (gray) color. However, such a method results in color failure if the given image is dominated by one or two colors.

Another white balancing method to overcome color failure includes splitting the image into RGB blocks; finding an average value of each RGB block, and extracting only the blocks the average value of which lies in a predetermined range. Gain control of RGB components is performed so that the RGB average values of the extracted blocks result in an achromatic color. Such methods are effective insofar as the light sources (capture illuminants) were restricted to a certain range of color temperatures and fail to provide good white balance control when the light sources with extreme color temperature (either side from day light) are used for illumination.

In addition, all gray worlds based methods use static thresholds to extract blocks/pixels from an image. Hence, using a fixed threshold will affect robust extraction of blocks/pixels that represent color of the light source. Such gray world based methods may pick colored pixels that do not represent the true color of a light source resulting in calculating gain (of the primary colors) might lead to color failure.

Hence, there is a well-felt need to provide a system and method to perform automatic white balancing that gives images of very high objective and subjective quality while having a computationally simple processing method for easy implementation.

SUMMARY

Embodiments of the invention relate to automatic white balancing of an input image. Accordingly, a system is disclosed that includes a cast detector configured to receive and classify an input image based at least in part on a selection of constituent pixels of the input image. The cast detector is further configured to select the constituent pixels based on a computed reliability of each of the constituent pixels to convey at least one characteristic of a capture illuminant. The system further includes a cast balancer. The cast balancer is configured to perform white balancing of the input image based on the classification of the input image by the cast detector. The cast balancer is further configured to identify the capture illuminant based on at least one characteristic represented by each of the selected constituent pixels.

BRIEF DESCRIPTION OF THE DRAWINGS

Further aspect of the present invention together with additional features contributing thereto and advantages occurring there from will be apparent from the description of preferred embodiments of the present invention which are shown in the accompanying drawing figures.

DETAILED DESCRIPTION OF THE INVENTION

Various Aspects of the invention are described below in different exemplary embodiments of the invention and the drawings, however it will be appreciated for the benefit of the disclosure that the invention is not restricted to particular embodiments described hereinafter and the drawings illustrate merely implementation level details, to aid the reader in understanding the principles of the invention. The underlying principle can be devised and practiced by those skilled in the art in various other ways while not deviating from the spirit and scope of the invention.

Figure 1:
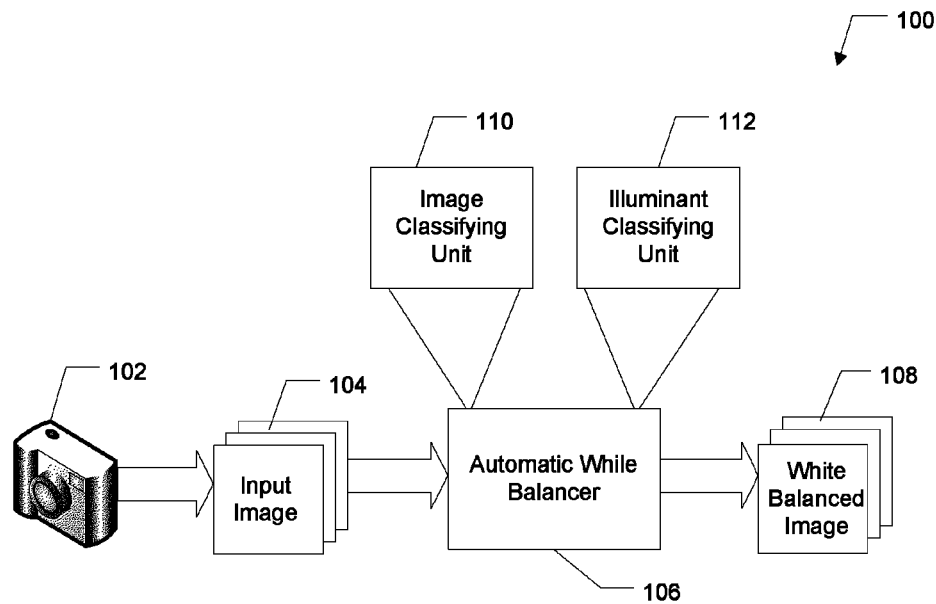
FIG. 1 illustrates an environment where the system in accordance with the present invention is implemented.

FIG. 1 illustrates an example automatic white balancing system (100) where an automatic white balancer (106) in accordance with the present invention is implemented. As illustrated therein, the automatic white balancer (106) is deployed for automatic white balancing of an input image (104) received from an image-capturing device, such as, for example, a camera device (102). The output of the automatic white balancer is a white balanced image (108). The automatic white balancer (106) includes an image classifying unit (110) and an illuminant classifying unit (112). The image classifying unit (110) classifies the input image (104) as white balance, color bias, unclassifiable. The illuminant classifying unit (112) classifies an illuminant (illuminating the input image) based on a set of reference illuminant parameters and a set of representative illuminant parameters. An image which has been classified as color biased (206) (as shown in FIG. 2) by the image classifying unit (110) is white balanced based on the classification of the illuminant by the illuminant classifying unit (112).

Figure 2:
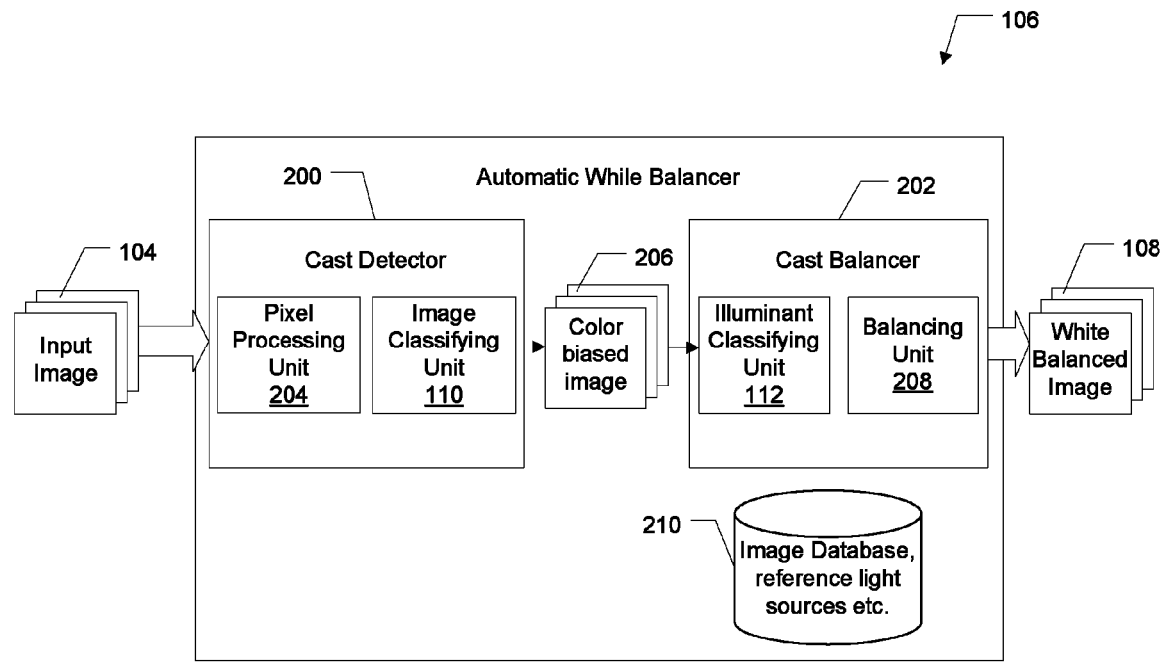
FIG. 2 is an exploded view of the system in accordance with an embodiment of the present invention.

FIG. 2 is an exploded view of the example automatic white balancer (106). In this example, the automatic white balancer (106) comprises a cast detector (200), a cast balancer (202) and an image database (210). The cast detector (200) is configured to receive and classify the input image (104) based on the selection of constituent pixels of the input image (104). The constituent pixels represent characteristics of a capture illuminant (light source). A pixel processing unit (204) within the cast detector (200) is configured to select the constituent pixels from the input image (104) and an image classifying unit (110) within the case detector (200) is configured to classify the input image (104) based on red, green, and blue values of the constituent pixels selected by the pixel-processing unit (204). The cast detector (200) is further configured to select the constituent pixels based on a computed reliability of the constituent pixels to convey at least one characteristic of a capture illuminant. The cast balancer (202) is configured to perform white balancing of the input image (104) based on the classification of the input image (104) by the cast detector (200). The cast balancer (202) identifies the capture illuminant based on the characteristics represented by the selected constituent pixels. The cast detector (200), thus, performs analyses of the input image (104) to determine whether color cast (i.e. color bias) is present or not. Thus, cast balancing by the cast balancer (202) can be said to be applied only to those input images (104) classified as having color cast. The output image is the automatic white balanced image.

In one embodiment, the pixel processing unit (204) is configured to select the constituent pixels having a green value (G) lying in a predetermined range. Further, weighted function of the green value id defined. The weighted function is defined based on a determination that a higher weight is assigned to a middle band green value. Thereafter, for each selected constituent pixel a range of red and blue values may be computed based on the green value of the constituent pixel.

In another example embodiment, the pixel-processing unit (204) is configured to compute a first metric and a second metric for each non-saturated constituent pixel based on a comparison of the red and blue values of the non-saturated constituent pixel. Thereafter, a first pixel count and a second pixel count may be computed corresponding to the first and second metrics respectively.

In yet another example embodiment, the pixel processing unit (204) is configured to compute a difference between the corresponding red value and the blue value for each of the selected constituent pixels having corresponding red and blue values in the determined range of values. The pixel processing unit (204) thereafter compares the computed difference with a predetermined first threshold. If the computed difference is less than the predetermined first threshold then a third metric and a fourth metric is computed based on a comparison of the red and the blue values of the selected constituent pixel and a third pixel count and a fourth pixel count is computed corresponding to the third and forth metrics respectively.

In another example embodiment, the image classifying unit (110) is configured to compare the first, the second, the third, and the fourth pixel counts with a predetermined second threshold and based on the comparison, one of the first, second, third, and forth metrics is selected. The selected metric corresponds to the pixel count characterized by a maximum count value.

In another example embodiment, an image classifying unit (110) is configured to compute gain coefficients based on the selected metric. The gain coefficients represent ratios of color values of the constituent pixels in accordance with the selected metric. In this example, the image classifying unit (110) is further configured to determine whether the gain coefficients are less than a predetermined third threshold. Based on the determination, the input image is classified as one of color biased image (206) and white balanced image (108). In this example, the cast detector (200) provides a color biased image (206) as input to the cast balancer (202). The cast balancer (202) is configured to perform white balancing of the color biased image (206) based on the classification of the color biased image (206). The cast balancer (202) thence, identifies the capture illuminant based on the characteristic represented by each of the selected constituent pixels.

In one example embodiment, the cast balancer (202) consists of an illuminant classifying unit (112) and a balancing unit (208). The illuminant classifying unit (112) is configured to define a set of reference illuminant parameter based on pre-stored database images and a set of reference light sources. The pre-stored database images and the set of reference light sources can be stored in an image database (210). The illuminant classifying unit (112) calculates a set of representative illuminant parameters of the color biased image (206) where the set of representative illuminant parameters correspond to at least one characteristic of a capture illuminant and identifies a type of capture illuminant based on a comparison of the set of reference illuminant parameters with the set of representative illuminant parameters. The balancing unit (208) is configured to perform white balancing of the color biased image (206) based on the identification. The cast balancer (202) provides the white balanced image (108) of the input image (104).

Figure 3:
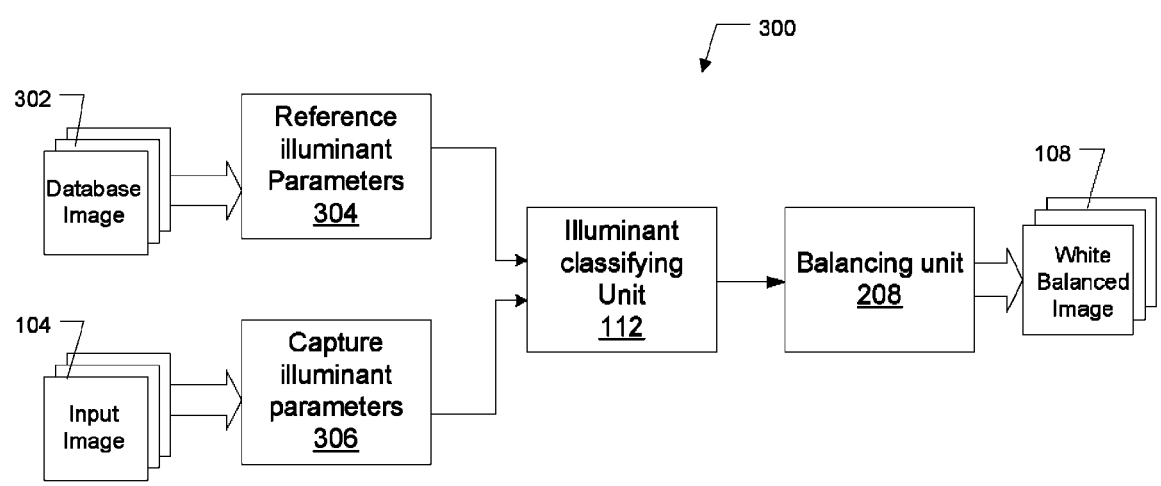
FIG. 3 is a schematic diagram illustrating the light source classification process in accordance with an embodiment of the present invention.
Figure 4A:
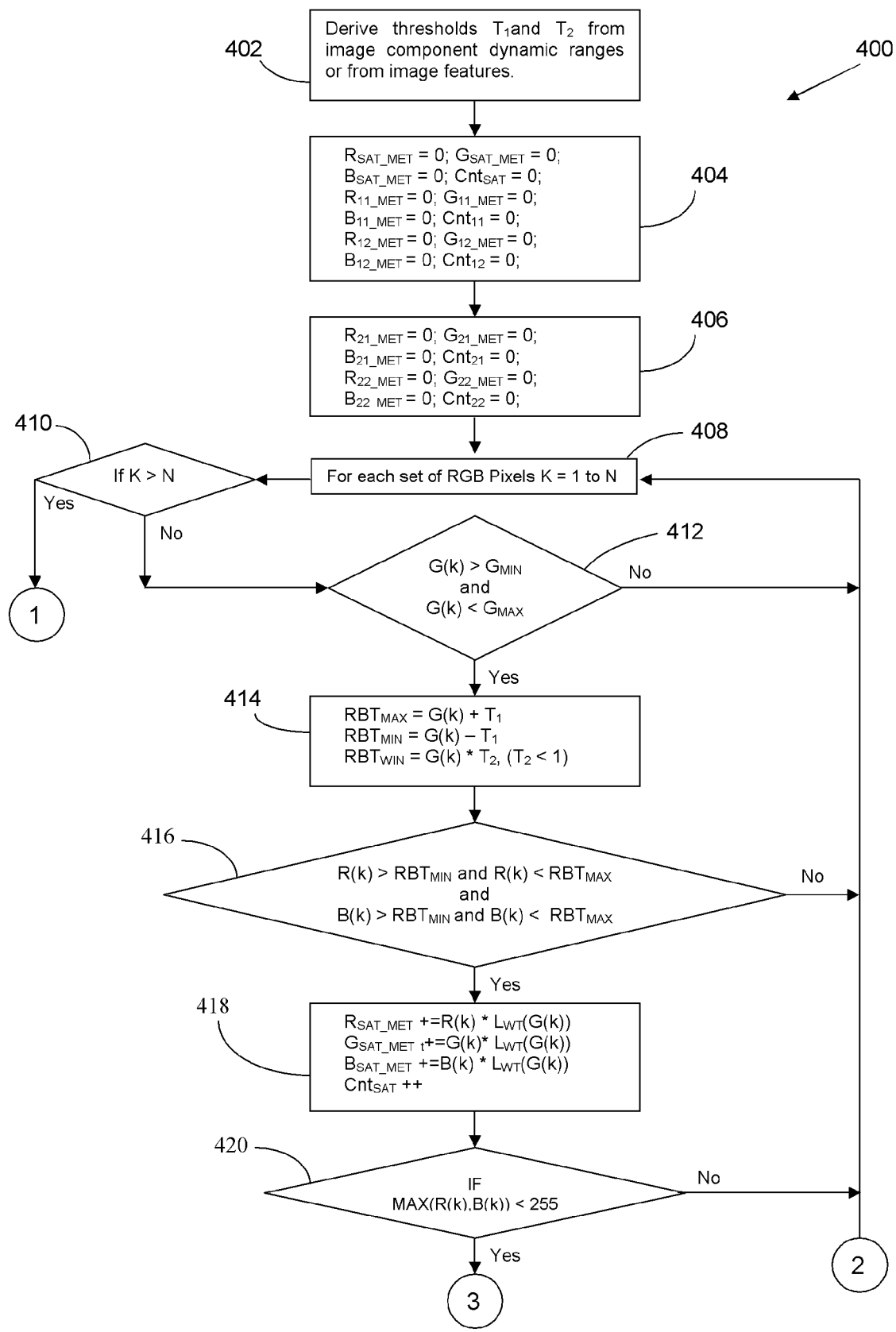
FIG. 4(a) (b) (c) is an example flow chart illustrating the process of automatic white balancing (AWB) of an input image in accordance with an embodiment of the present invention.
Figure 4B:
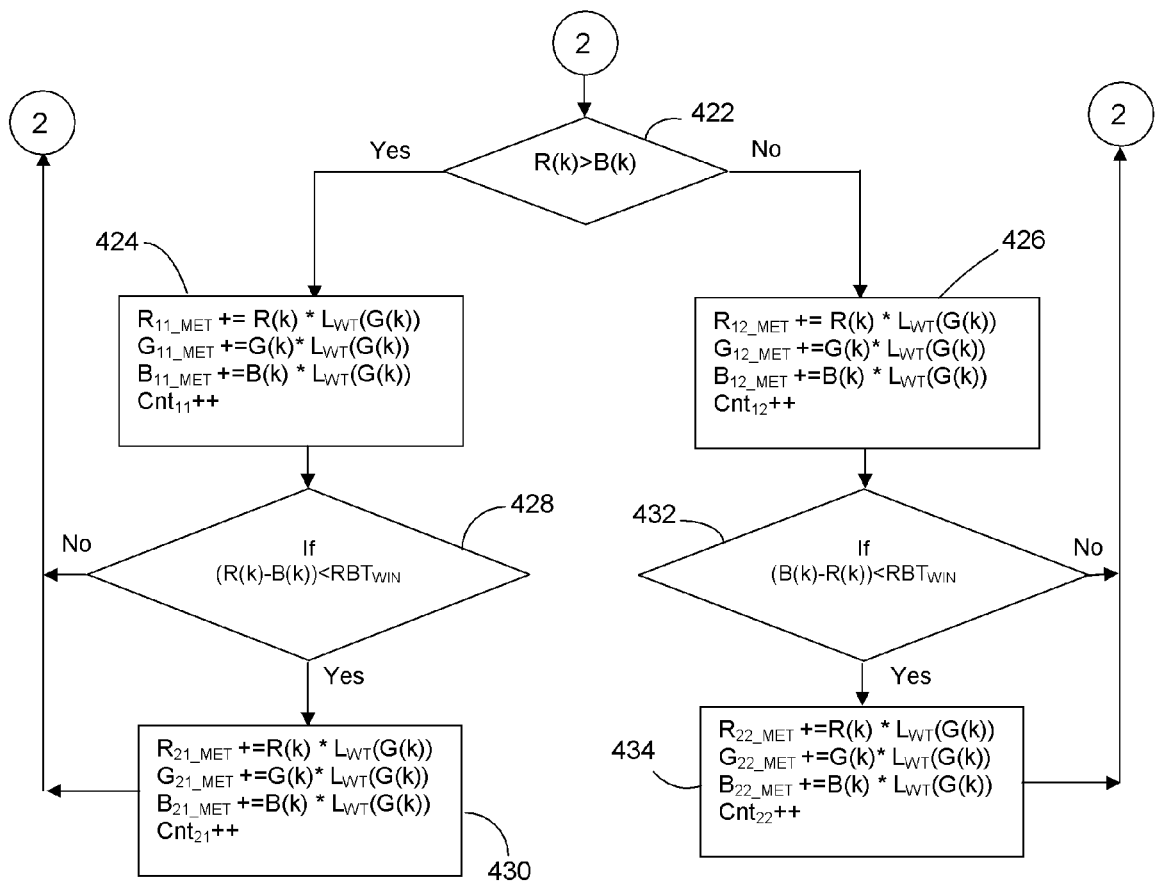
Figure 4:
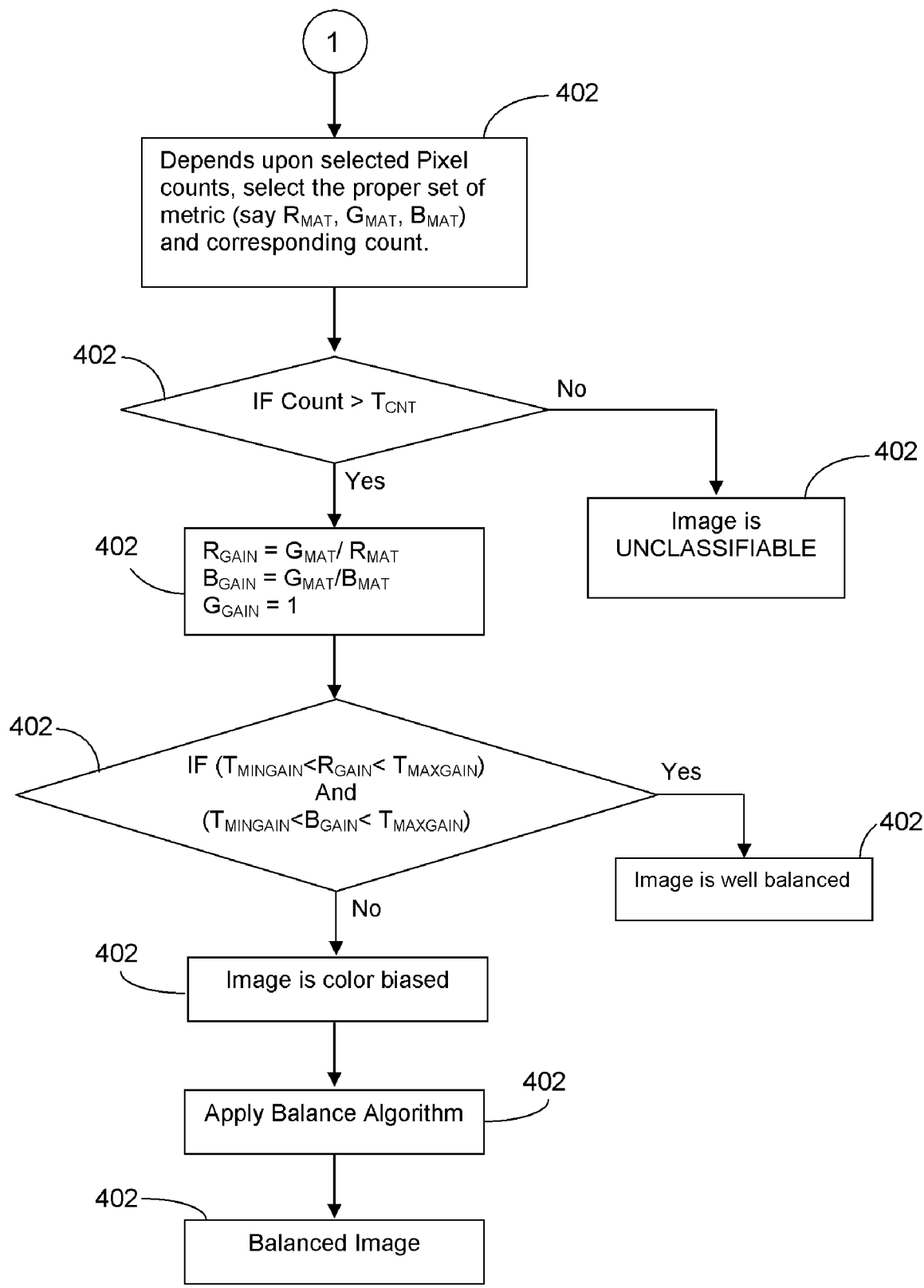

FIG. 3 is an example schematic diagram illustrating the process of automatic white balancing (AWB) of an input image (104) in accordance with an embodiment of the present invention. A set of representative illuminant parameters of the input image (104) are calculated. The set of representative illuminant parameters correspond to the capture illuminant parameters (306) and the calculated capture illuminant parameters (306) can be provided as one of the input to the illuminant classifying unit (112) for further processing. Also, a set of reference illuminant parameters (304) based on pre-stored database images and a set of reference light sources in an image database (210) and reference illuminant parameters (304) can be provided as another input to the illuminant classifying unit (112) for further processing. The illuminant-classifying unit (112) compares the set of reference illuminant parameters (304) and the set of capture illuminant parameters (306) and performs a classification process to identify the illumination. Upon identifying the illumination based on the comparison performed by the illuminant classifying unit (112), the balancing unit (208) applies a preset matrix to balance the image according to the identified illumination. The schematic diagram (300) for automatic white balancing using the illuminant classifying unit (112) and the balancing unit (208) will be described in detail in the following description with the help of two example images which contains three color channels and the Bayer pattern respectively.

Further, an example flow diagram for automatic white balancing as implemented by the automatic white balancer (106) is illustrated in Figures (a) (b) (c).

Example-1

AWB Using Three Color Channels (RGB)

Simulated database images are used with a number of reference light sources corresponding to various color temperatures find a number of reference illuminants parameter set. A 3×3 Laplacian filter (−1, −1, −1; −1, 8, −1; −1, −1, −1) can be used to extract the edge information. First the mask is applied over entire R, G and B planes individually and then the threshold is applied to remove the weak edges in each plane. Finally the average over complete plane is determined and then the R by G and B by G ratios are obtained. These ratios are used as reference illuminants parameter set. These ratios can be represented as:

$$R\_G_{Met} = \frac{\sum_{i=0}^{M}\sum_{j=0}^{N} F_R(i,j)}{\sum_{i=0}^{M}\sum_{j=0}^{N} F_G(i,j)}, \begin{cases} F_x(i,j) = \text{abs}(\nabla^2(x(i,j))), \text{ if} \\ \text{abs}(\nabla^2(x(i,j))) \geq T \\ F_x(i,j) = 0, \text{ if} \\ \text{abs}(\nabla^2(x(i,j))) < T \end{cases}$$

$$R\_G_{Met} = \frac{\sum_{i=0}^{M}\sum_{j=0}^{N} F_R(i,j)}{\sum_{i=0}^{M}\sum_{j=0}^{N} F_G(i,j)}, \begin{cases} F_x(i,j) = \text{abs}(\nabla^2(x(i,j))), \text{ if} \\ \text{abs}(\nabla^2(x(i,j))) \geq T \\ F_x(i,j) = 0, \text{ if} \\ \text{abs}(\nabla^2(x(i,j))) < T \end{cases}$$

$$B\_G_{Met} = \frac{\sum_{i=0}^{M}\sum_{j=0}^{N} F_B(i,j)}{\sum_{i=0}^{M}\sum_{j=0}^{N} F_G(i,j)}, \begin{cases} F_x(i,j) = \text{abs}(\nabla^2(x(i,j))), \text{ if} \\ \text{abs}(\nabla^2(x(i,j))) \geq T \\ F_x(i,j) = 0, \text{ if} \\ \text{abs}(\nabla^2(x(i,j))) < T \end{cases}$$

Where (i, j) are integers denoting the spatial coordinates, $F_R, F_G, F_B$ are the Laplacian of Red, Green and Blue channels respectively, N, M are the width and height of the image, and T is the threshold. If T=0, it is the same as taking the Laplacian values directly. If the value of T increases, that excludes the weaker edges. Likewise the reference illuminants parameter set is extracted from all the database images.

Representative illuminant parameter set can be extracted by using Laplacian 2-D spatial mask over three-color planes of image under examination. The color temperature of the light source is governed by the shift in representative parameters from unity. The shift is due to the spectral distribution of the light source under which the image is captured. Light source color temperature is identified by comparing the representative illuminant parameter set with the all reference illuminants parameter set and uses K-nearest neighbor classification (K-NNC) to identify the illuminant. Euclidian distance is used a distance measure and K is equal to 5. If there is a tie in classification, the color temperature corresponding to minimum distance is selected as the result. Correct preset matrix is applied to balance the image under examination. The preset matrices corresponding to all color temperatures under consideration are stored. Based on the color temperature determined hereinbefore, the appropriate preset matrix is used to balance the image under examination.

$$\hat{I} = I * A$$

Where I is the input image having N (width*height) color samples, with each color sample being represented using red (R), green (G), and blue (B) intensities, $\hat{I}$ is the balanced image and A is the preset matrix.

The above process is useful in case of three sensor (like X3F) technology (where R, G and B are captured at each pixel). However, for the image captured with CFA filter, since CFA interpolation enforces high frequencies of the color planes to be similar, the spectral method cannot be used on the CFA interpolated data. An example method of identifying the color temperature in such a case has been explained in the following example (Example 2).

Example-2

AWB Using Bayer Pattern

| R | G | R | G | R |
| G | B | G | B | G |
| R | G | R | G | R |
| G | B | G | B | G |
| R | G | R | G | R |

In this example the observed samples of red and blue channels is used to obtain a down-sampled image of red (rd) and blue (bd) channels. Also two down-sampled images of green channels (g1d, g2d) are obtained using alternate rows in Bayer input. Mathematically rd, bd, g1d and g2d samples are represented as rd(1:1:BayerWidth, 1:1:BayerHeight)=IN(1:2:width, 1:2:height);

g1d(1:1:BayerWidth, 1:1:BayerHeight)=IN(2:2:width, 1:2:height);

g2d(1:1:BayerWidth, 1:1:BayerHeight)=IN(1:2:width, 2:2:height);

bd(1:1:BayerWidth, 1:1:BayerHeight)=IN(2:2:width, 2:2:height);

Where IN is the Bayer input as shown in FIG. 2, (XStart: XInc:XEnd, YStart: YInc:YEnd) are integers denoting start, increment and end of the spatial coordinates.

Number of reference illuminant's parameters by using simulated database images with a number of reference light sources corresponding to various colour temperatures are under consideration. The sub-sampled images of red, green1, green2 and blue channels are extracted from the simulated images. The Laplacian spatial mask is then applied over entire sub-sampled rd, g1d, g2d and bd planes individually and then the threshold is applied to remove the weak edges in each plane. Finally the average is obtained over the complete plane and then the R by G1 and B by G2 ratios are found. These ratios are used as reference illuminant's parameters. These ratios can be represented as $$R\_G1_{Met} = \frac{\sum_{i=0}^{M}\sum_{j=0}^{N} F_{rd}(i,j)}{\sum_{i=0}^{M}\sum_{j=0}^{N} F_{g1d}(i,j)}, \begin{Bmatrix} F_x(i,j) = \text{abs}(\nabla^2(x(i,j))), \text{ if} \\ \text{abs}(\nabla^2(x(i,j))) \geq T \\ F_x(i,j) = 0, \text{ if} \\ \text{abs}(\nabla^2(x(i,j))) < T \end{Bmatrix}$$

$$B\_G2_{Met} = \frac{\sum_{i=0}^{M}\sum_{j=0}^{N} F_{bd}(i,j)}{\sum_{i=0}^{M}\sum_{j=0}^{N} F_{g2d}(i,j)}, \begin{Bmatrix} F_x(i,j) = \text{abs}(\nabla^2(x(i,j))), \text{ if} \\ \text{abs}(\nabla^2(x(i,j))) \geq T \\ F_x(i,j) = 0, \text{ if} \\ \text{abs}(\nabla^2(x(i,j))) < T \end{Bmatrix}$$

Where (i, j) are integers denoting the spatial coordinates, $F_{rd}$, $F_{g1d}$, $F_{g2d}$ and $F_{bd}$ are the samples of sub-sampled rd, g1d, g2d and bd planes respectively, N, M are the width and height of the sub-sampled image, and T is the threshold. If T=0, it is same as taking the Laplacian values directly. If the value of T increases, that excludes the weaker edges. Likewise the reference illuminant's parameters are extracted from all the data base images.

Representative illuminant parameters of the image under examination are extracted. This is done by using Laplacian 2-D spatial mask over the four sub-sampled planes of the image under examination. The R by G1 and B by G2 ratios of average absolute Laplacian over complete plane are used to determine the representative illuminant parameters.

K-nearest neighbor classification (K-NNC) can be used to identify the illuminant. Euclidian distance is used a distance measure and K is equal to 5. If there is a tie in classification, the color temperature corresponding to minimum distance is selected as a result. This process is same as previous example and matches the representative to reference parameters.

Correct preset matrix can be applied to balance the image under examination. The preset matrices corresponding to all color temperatures under consideration are stored as discussed in previous example. Based on the color temperature determined hereinbefore, the appropriate preset matrix is used to balance image under examination. This process is exactly same as previous example, but the preset matrix A can be the diagonal matrix. In the previous example the preset matrix could be either diagonal or non diagonal matrix.

In another exemplary embodiment balanced images corresponding to all color temperatures is calculated. Further, the analysis of the balanced images and selection of the illuminant color temperature can be done using Figure of Merit (FOM). The balancer balances the input image using the preset matrix corresponding to the selected illuminant color temperature. In this embodiment, to obtain balanced images corresponding to all color temperatures it is needed to select a window from a region of interest in an image under examination. For example, a center window (10% input width by 10% input height) is chosen for examination. To obtain the preset matrix corresponding to all the color temperatures under consideration from a storage device therefore applies a preset matrices corresponding to all color temperatures on the chosen image window $$\hat{I}_n = I^* A_n, \; 0 \leq n < K$$

Where I is the input image (103) having N (window width*window height) color samples, with each color sample being represented by red (R), green (G), and blue (B) intensities, $\hat{I}_n$ is the balanced image with $A_n$ preset matrix, n indicates the color temperature (or the corresponding preset matrix), k is the number of color temperatures under consideration.

To perform analysis of the balanced images Laplacian 2-D spatial mask can be used over the three color planes of the balanced image data. The R by G and B by G ratios of the average absolute Laplacian can be used as representative parameters. This process is repeated for all the balanced images corresponding to various color temperatures.

The illuminant color temperature under which the image is captured can be determined using Figure of Merit (FOM), which is obtained as follows. It has been observed that for an image captured under white light, the R by G and B by G high frequency ratios (Laplacian) are nearly equal (and also equal to unity. Therefore, the absolute difference of R by G and B by G ratios is used as Figure of Merit (FOM).

$$FOM(\lambda_i) = ABS(R_i/G_i - B_i/G_i)$$

Where $FOM(\lambda_i)$ is the Figure of merit of $i^{th}$ light source, $R_i$, $G_i$ and $B_i$ are the red, green and blue channels of the image balanced with preset matrix corresponding to the $i^{th}$ light source. i.e. the colour temperature for which the FOM is minimum is chosen as the illuminant colour temperature. The input image is balanced. This involves using the preset matrix corresponding to the colour temperature selected in the previous step and applying that matrix to the image under examination.

$$\hat{I} = I^* A$$

Where I is the input image having N (width*height) colour samples, with each colour sample being represented using red (R), green (G), and blue (B) intensities, $\hat{I}$ is the balanced image (105) and A is the preset matrix.

In yet another implementation, a method for automatic white balancing of an input image is disclosed. The method includes acquiring an input image illuminated by a capture illuminant. Thereafter, constituent pixels are selected from the acquired input image based on weighted pixel values of the constituent pixels. The weight assigned to the pixel values signifies reliability of the pixel values for an accurate identification of the capture illuminant. The method further includes classifying the input image based on the weighted pixel values of the selected constituent pixels. In one example, classifying the image includes determining whether the image is white balanced or color biased. Based on the classification of the input image, a set of reference illuminant parameters are defined utilizing a pre-stored database images and a set of reference light sources. Thereafter, a set of representative illuminant parameters associated with the capture illuminant is computed. Based on a comparison of the set of reference illuminant parameters and set of representative illuminant parameters a type of capture illuminant is captured and based on the identification of the type of capture illuminant the input image is white balanced.

In one embodiment, defining the set of reference illuminant parameters and computing a set of representative illuminant parameters includes computing correlation coefficients between high frequencies of red, green, and blue channels.

In still another embodiment, the correlation coefficients are computed between high frequencies of sub-sampled red, green1, green2, and blue channels.

In yet another embodiment, computing a set of representative illuminant parameters includes selecting a portion of the input image and generating the representative illuminant parameters for the selected portion of the input image.

It will be appreciated that the teachings of the present invention can be implemented as a combination of hardware and software. The software is preferably implemented as an application program comprising a set of program instructions tangibly embodied in a computer readable medium. The application program capable of being read and executed by hardware such as a computer or processor of suitable architecture. Similarly, it will be appreciated by those skilled in the art that any examples, flowcharts, functional block diagrams and the like represent various exemplary functions, which may be substantially embodied in a computer readable medium executable by a computer or processor, whether or not such computer or processor is explicitly shown. The processor can be a Digital Signal Processor (DSP) or any other processor used conventionally capable of executing the application program or data stored on the computer-readable medium The example computer-readable medium can be, but is not limited to, (Random Access Memory) RAM, (Read Only Memory) ROM, (Compact Disk) CD or any magnetic or optical storage disk capable of carrying application program executable by a machine of suitable architecture. It is to be appreciated that computer readable media also includes any form of wired or wireless transmission. Further, in another implementation, the method in accordance with the present invention can be incorporated on a hardware medium using ASIC or FPGA technologies.

It is to be appreciated that the subject matter of the claims are not limited to the various examples an language used to recite the principle of the invention, and variants can be contemplated for implementing the claims without deviating from the scope. Rather, the embodiments of the invention encompass both structural and functional equivalents thereof.

While certain present preferred embodiments of the invention and certain present preferred methods of practicing the same have been illustrated and described herein, it is to be distinctly understood that the invention is not limited thereto but may be otherwise variously embodied and practiced within the scope of the following claims.

We claim:

1. An automatic white balancing system, the system comprising:
    a cast detector configured to receive and classify an input image based at least in part on a selection of constituent pixels of the input image, wherein the cast detector is further configured to select the constituent pixels based on a computed reliability of each of the constituent pixels to convey at least one characteristic of a capture illuminant, the cast detector including:
        a pixel processing unit configured to select the constituent pixels from the input image, wherein the pixel processing unit is configured to:
            select the constituent pixels having a green value (G) lying in a predetermined range;
            define a weighted function of the green value, the weighted function being so defined to assign a higher weight to a middle band green value;
            for each selected constituent pixel, compute a range of red and blue values based on the green value of the constituent pixel;
            for each non-saturated constituent pixel, compute a first metric and a second metric based on a comparison of the red and blue values of the non-saturated constituent pixel; and
            compute a first pixel count and a second pixel count corresponding to the first and second metrics respectively; and
        an image-classifying unit configured to classify the input image based on red, green, and blue values of the constituent pixels selected by the pixel processing unit; and
    a cast balancer configured to perform white balancing of the input image based on the classification of the input image by the cast detector, wherein the cast balancer is further configured to identify the capture illuminant based on at least one characteristic represented by each of the selected constituent pixels.

2. The system of claim 1, wherein the pixel processing unit is further configured to:
    compute, for each of the selected constituent pixels having corresponding red and blue values in the determined range of values, a difference between the corresponding red value and the blue value;
    determine whether the computed difference is less than a predetermined first threshold;
    on a positive determination, compute a third metric and a fourth metric based on a comparison of the red and the blue values of the selected constituent pixel; and
    compute a third pixel count and a fourth pixel count corresponding to the third and forth metrics respectively.

3. The system of claim 2, wherein the image classifying unit is configured to:
    compare the first, the second, the third, and the fourth pixel counts with a predetermined second threshold; and
    based on the comparison, select one of the first, second, third, and forth metrics, the selected metric corresponding to the pixel count characterized by a maximum count value.

4. The system of claim 3, wherein the image classifying unit is configured to:
    compute gain coefficients based on the selected metric, wherein gain coefficients represent ratios of color values of the constituent pixels in accordance with the selected metric;
    determine whether the gain coefficients are less than a predetermined third threshold; and
    classify the input image as one of color biased and white balanced based on the determination.

5. The system of claim 4, wherein the cast balancer comprises an illuminant classifying unit configured to:
    for the input image classified as a colorbiased image, define a set of reference illuminant parameter based on pre-stored database images and a set of reference light sources;
    calculate a set of representative illuminant parameters of the input image, wherein the set of representative illuminant parameters correspond to the at least one characteristic of a capture illuminant; and
    identify a type of the capture illuminant based on a comparison of the set of reference illuminant parameters with the set of representative illuminant parameters.

6. The system of claim 5, wherein the cast balancer further comprises a balancing unit configured to perform white balancing of the input image based on the identification.

7. The system of claim 1, wherein the predetermined range corresponds to 40-90% of total dynamic range of green values of the constituent pixels of the input image.

* * * * *